Feb. 19, 1963 W. E. GLENN, JR 3,078,338
ORTHOGONAL DIFFRACTION GRATINGS FOR COLOR REPRODUCTION
Filed March 13, 1959 5 Sheets-Sheet 3
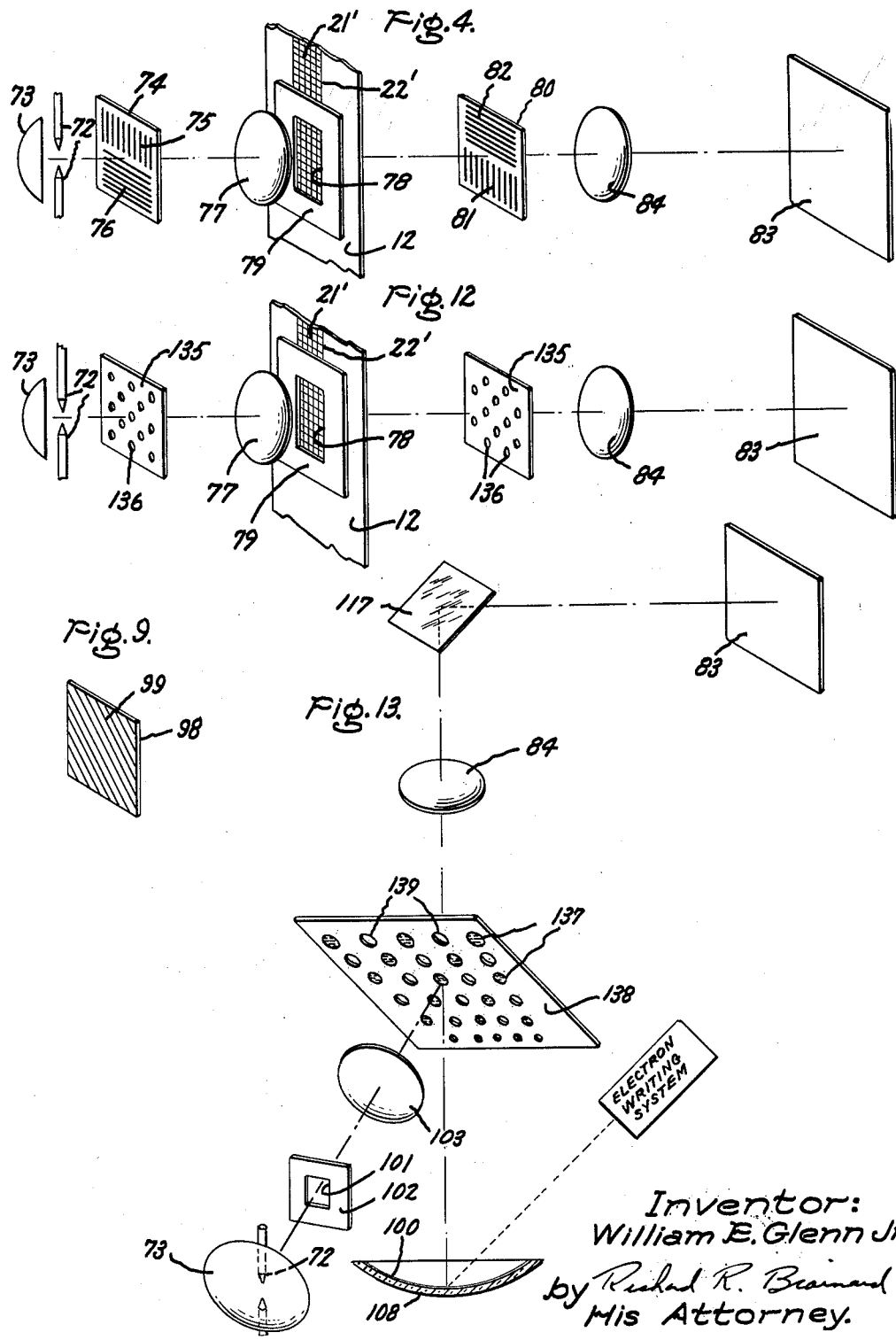
Inventor:
William E. Glenn Jr.,
by Richard R. Brainard
His Attorney.

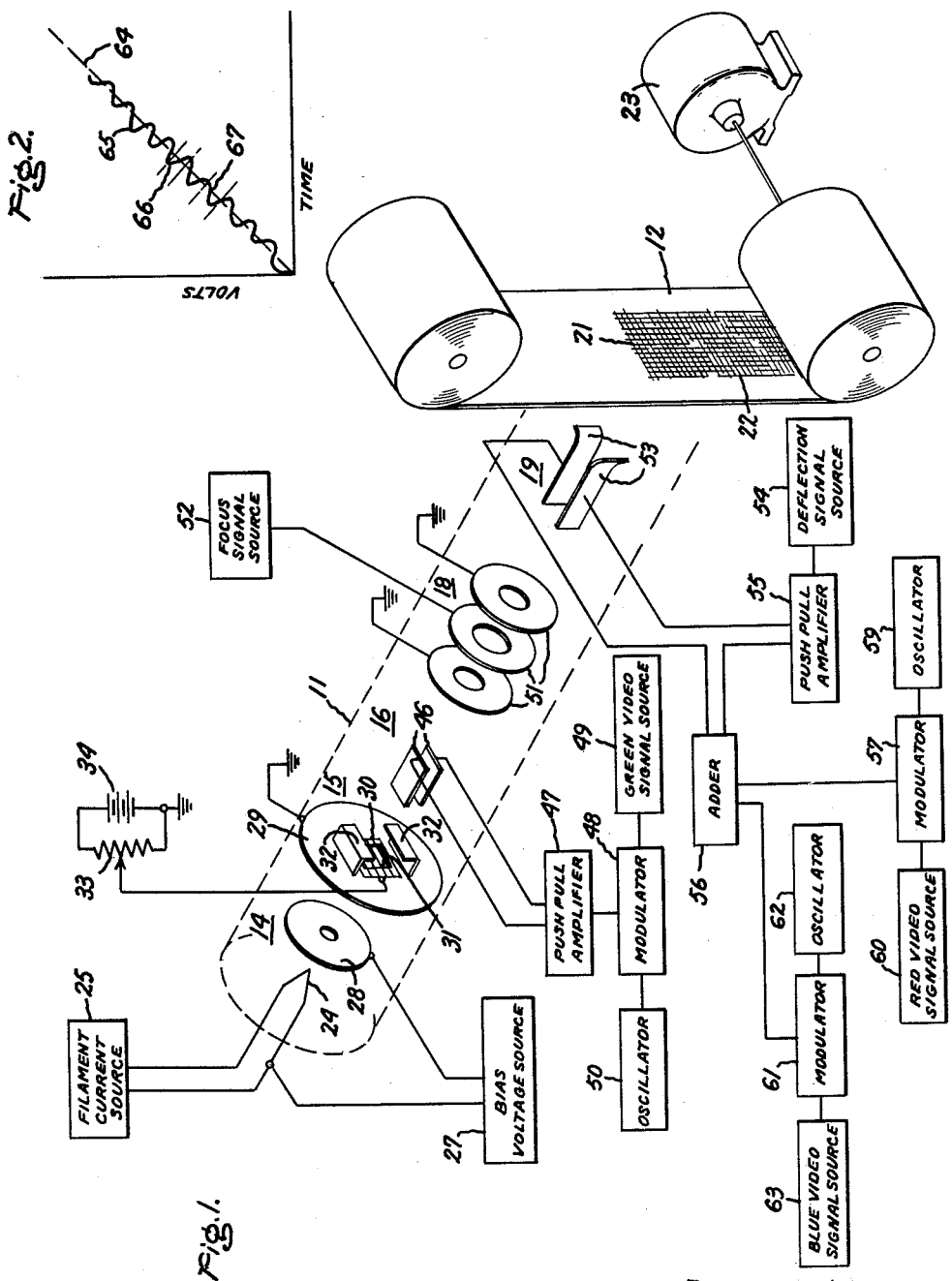

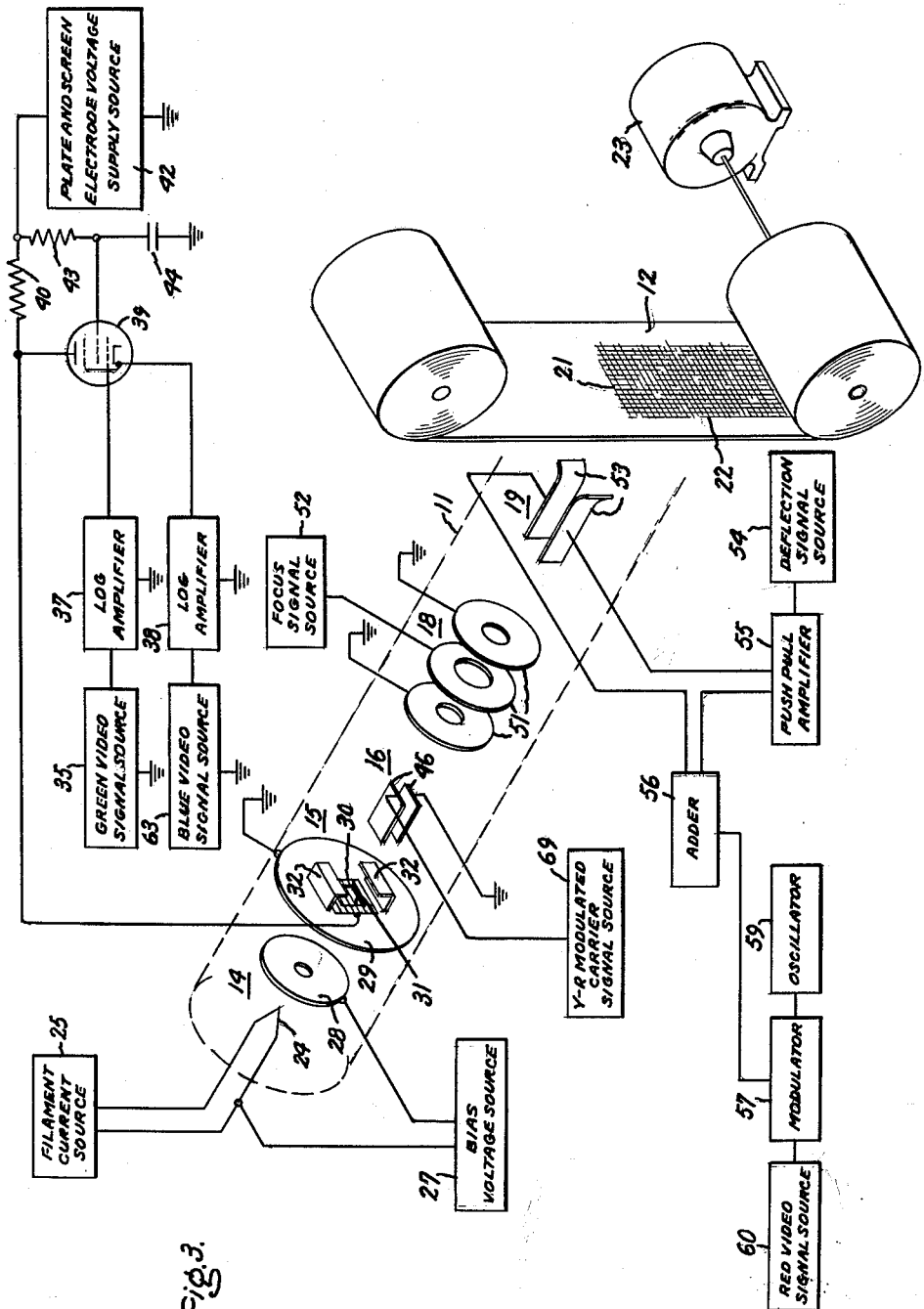

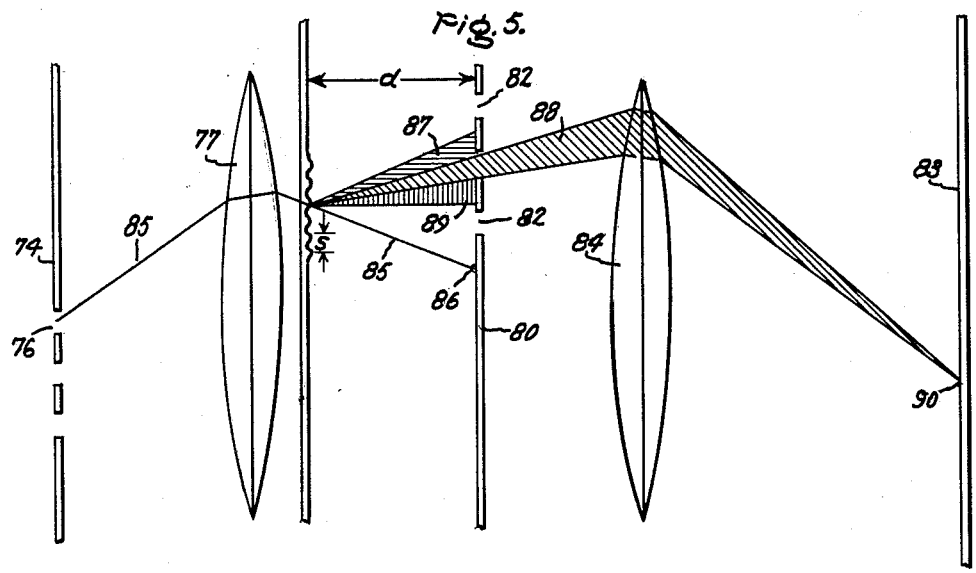
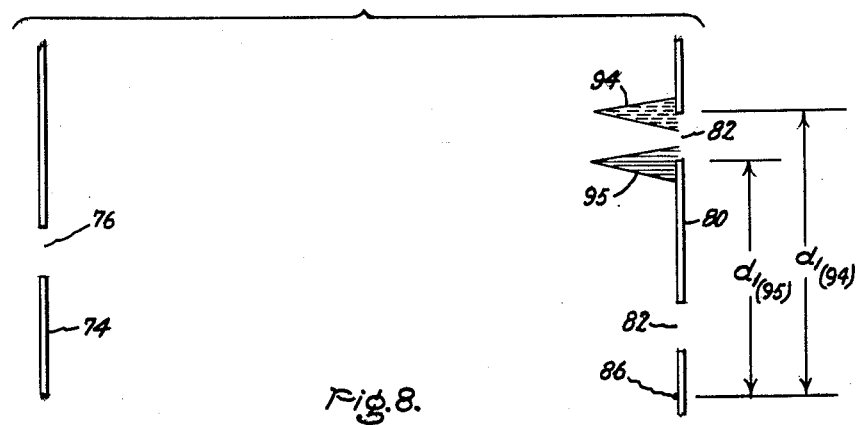
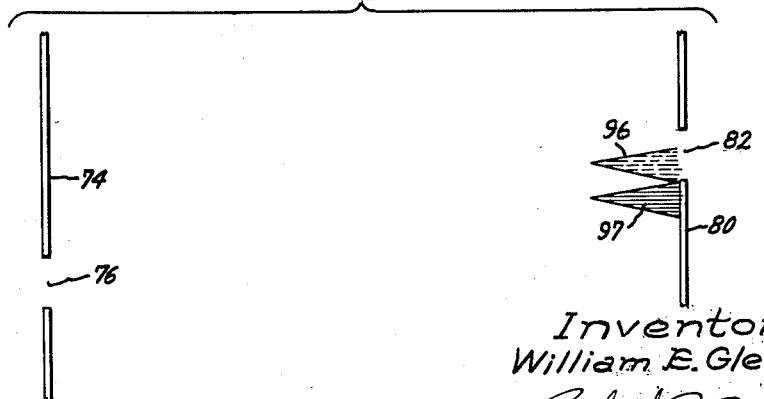
Inventor:
William E. Glenn Jr.,
by Richard R. Brainard
His Attorney.

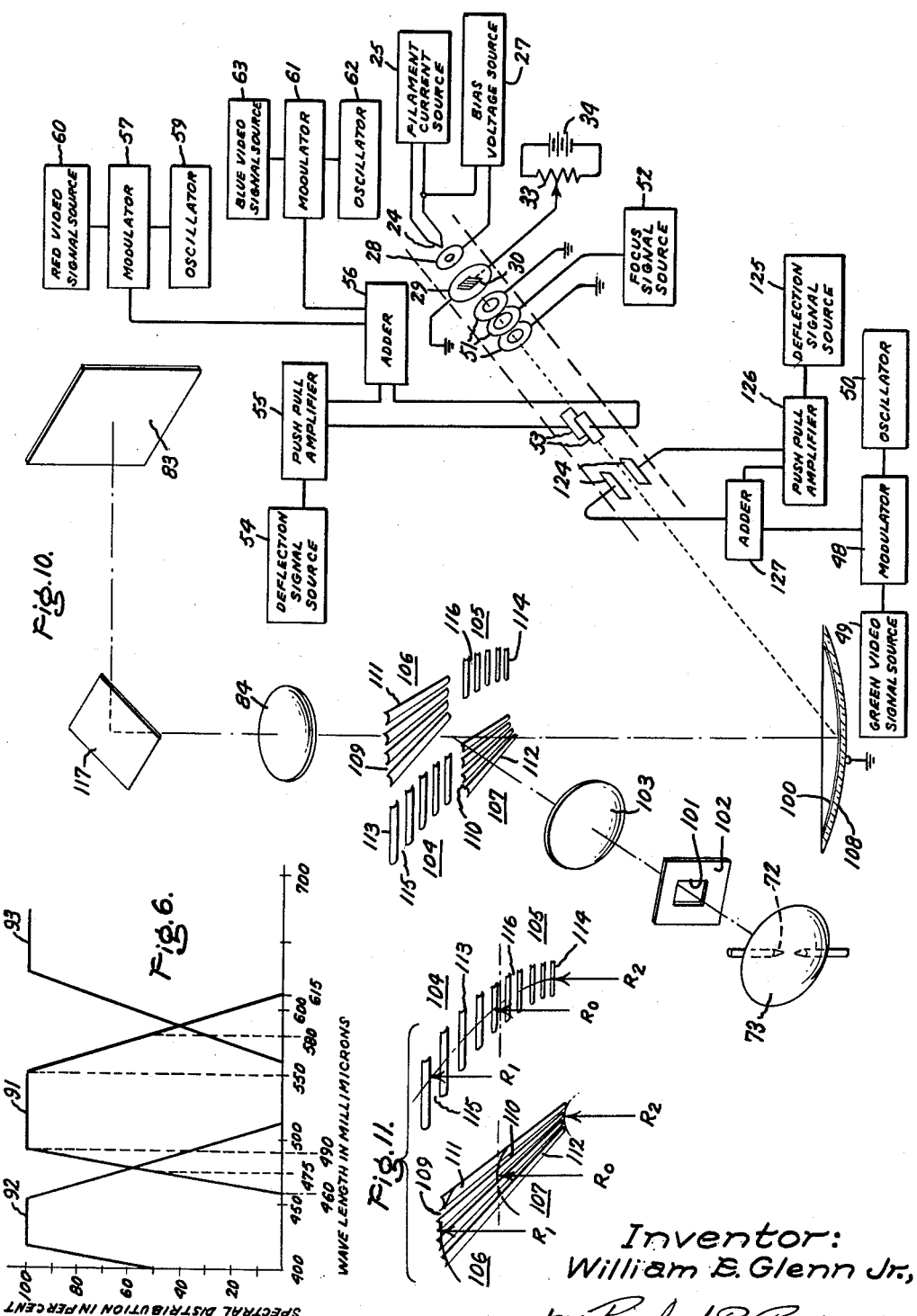

United States Patent Office

3,078,338
Patented Feb. 19, 1963

3,078,338
ORTHOGONAL DIFFRACTION GRATINGS FOR
COLOR REPRODUCTION
William E. Glenn, Jr., Scotia, N.Y., assignor to General
Electric Company, a corporation of New York
Filed Mar. 13, 1959, Ser. No. 799,295
20 Claims. (Cl. 178—5.4)

The present invention relates to an improved system for converting electrical signals into corresponding information in a light-modulating medium, and to an improved optical system for displaying this information.

The present patent application is a continuation-in-part of patent application Ser. No. 782,955, filed December 24, 1958, and assigned to the assignee of the present invention, now abandoned.

A projection system has been developed for projecting monochrome pictures in response to applied television signals. In this system, an electron beam, modulated by the applied television signals, deflects over the surface of a deformable light modulating medium on which it produces lines of electron charge having charge densities corresponding point-by-point with the light intensity of the correspondingly-positioned picture elements. A grounded conducting plane, placed beneath the light modulating medium, attracts the electrons so that they press in on the deformable light-modulating medium thereby producing corresponding lines of deformations, the depths of which depend upon the charge densities. These deformations form a phase diffraction grating.

Light cast on the surface of the light-modulating medium is diffracted by the diffraction grating onto transparent areas in a light mask as a function of the amplitude of the diffraction grating lines. Then, the light transmitted by the light mask is focused on a projection screen where it produces a monochrome image corresponding to the televised scene.

In my patent, P.N. 2,813,146, granted November 12, 1957, and assigned to the assignee of the present invention, a projection system is described and claimed that also utilizes diffraction gratings in a light modulating medium. But instead of monochrome images, it produces color or polychrome images corresponding to applied color television signals. To obtain these results, the system simultaneously produces several diffraction gratings, each having a wavelength or grating spacing corresponding to a different primary color: e.g., red, green, and blue. The diffraction gratings are usually identified by the colors to which they correspond. Thus, there may be a red diffraction grating, a green diffraction grating, and a blue diffraction grating. When the light modulating medium with these diffraction gratings is placed in a suitable optical system, substantially only the first order diffracted light of the primary colors corresponding to these diffraction gratings is diverted through the transparent areas in the light mask. These colors then combine on the projection screen to produce color images corresponding to the televised scene.

These color diffraction gratings, being simultaneously produced, are superimposed upon the light modulating medium and thus interfere with one another to produce beat gratings. Most of the beat gratings have such small grating spacings that they cannot be ressolved and hence do not appear on the projection screen. But the difference beat grating produced by interferences between the blue and green diffraction gratings may have a sufficiently large grating spacing to produce objectionable stripes on the projection screen.

Accordingly, an object of the present invention is to provide an improved projection system.

Still another object is to provide an improved color projection system.

Another object is to provide a color projection system for producing a color image substantially free from interference stripes.

A further object is to provide a system for producing a plurality of diffraction gratings in a light modulating medium without the formation of a beat grating by at least two of the diffraction gratings.

Still another object of the present invention is to provide an improved optical system for a color projection system.

A further object is to provide a system for producing orthogonally-arranged diffraction gratings in a light modulating medium.

The above-mentioned objects are obtained in one form of my invention in which an electron gun writing system forms the red and blue diffraction gratings in one direction and the green diffraction grating normal to these gratings. Then, since the blue and green diffraction gratings do not have parallel components, they do not interfere with one another. Prior optical systems cannot be used with this diffraction grating arrangement. Thus, I also provide a novel optical system having a light mask that blocks the zero order and most of the second and higher order diffracted light while transmitting most of the first order diffracted light of the colors corresponding to these gratings.

The novel features believed characteristic of the invention are set forth in the appended claims. The invention itself, together with further objects and advantages thereof, may best be understood by reference to the following description, taken in connection with the accompanying drawings, in which:

FIG. 1 is a schematic illustration of one electron writing system embodiment of the present invention, FIG. 2 is a graph of a portion of the horizontal deflection signal in the system of FIG. 1, FIG. 3 is a schematic illustration of another electron writing system embodiment of the present invention, FIG. 4 is a preferred embodiment of a transmission-type optical system of the present invention, FIG. 5 is an enlargement of a portion of the system of FIG. 4 in diagrammatic form, FIG. 6 is a spectral distribution diagram for a three primary color system, FIGS. 7 and 8 are schematic enlargements of portions of the system of FIG. 4, FIG. 9 is a perspective view of an alternative light mask, two of which can be substituted for the light masks in the FIG. 4 of embodiment.

FIG. 10 is a reflection-type optical system embodiment of the present invention, FIG. 11 is a perspective view illustrating the construction of the light mask of FIG. 10, FIG. 12 is another transmission-type optical system embodiment of the present invention, and FIG. 13 is another reflection-type optical system embodiment of the present invention.

In FIG. 1 an electron writing system, enclosed in an evacuated enclosure 11, produces phase diffraction gratings in a light modulating medium 12 which may be a tape with a thermoplastic surface such as described and claimed in my copending application, Serial No. 8,842 entitled "Method, Apparatus and Medium for Recording" and divisional application thereof Serial No. 84,424. Application Serial No. 8,842 is a continuation-in-part of my application, Serial No. 783,584, filed December 29, 1958, now abandoned. All of the above applications are assigned to the assignee of the present invention. One especially suitable tape has a Mylar base coated with cuprous iodide to which a thin film of polystyrene of medium molecular weight is adhered. In addition to thermoplastic-coated material, medium 12 may be any movable material that, when subjected to an electron charge or beam, changes in physical characteristics, such as transparency or surface irregularity, affecting the transmission or reflection of light. Medium 12 is also enclosed in an evacuated enclosure (not illustrated) that is connected to enclosure 11.

The principal components of the electron writing system are an electron gun assembly 14, a beam-splitting means 15, a charge density control means 16, a focusing system 18, and a deflection system 19.

In the operation of the electron writing system, the electron gun assembly 14 produces an electron beam that is split, or in other words divided, by beam-splitting means 15 into a plurality of initially convergent electron beams. They are made to converge at angles such that they strike the thermoplastic surface of medium 12 at points vertically separated by distances equal to the grating spacing of the desired green diffraction grating. The number of these beams is not critical, but for good color purity should be at least three and, due to difficulties of resolution, is limited to about seven or eight.

When these beams are deflected in a direction orthogonal to the movement of tape 12, they form lines of electron charge, the densities of which are controlled by charge density control means 16. Actually, it directly controls their widths and consequently their densities since the number of electrons in each line remains substantially the same irrespective of the line widths. Through control of the charge densities and thus also the amplitude of the resulting green diffraction grating, density control means 16 controls the intensity of the projected green color.

Each of the electron beams is focused by focusing system 18 to an individual, approximately round spot on the surface of medium 12.

Deflection system 19 produces horizontal movement between the electron beams and light modulating medium 12. It does not deflect the beams linearly but rather in steps separated by distances on medium 12 that are functions of the grating spacings of the desired red and blue diffraction gratings. The dwell at each step, and thus the magnitude of charge produced there, is a function of the instantaneous amplitude of either the red or blue video signal, depending upon the particular step.

Lines of electron charge 21 and 22 are produced by the deflected electron beams. As the vertically-spaced beams deflect horizontally across medium 12, they produce horizontally-extending lines of charge 21 and at the same time, due to the stepping action of the deflection, they produce vertically-extending lines 22 of charge. The separations between the horizontal lines 21 equal the grating spacings of the desired green diffraction grating and the separations between the vertical lines 22 are functions of the desired red and blue diffraction grating spacings.

When the thermoplastic surface of medium 12 is heated to a plastic condition, by means not shown, these lines of charge 21 and 22 deform the surface, forming a green diffraction grating with grating lines corresponding to the charge lines 21 and blue and red diffraction gratings with grating lines corresponding to the charge lines 22. Since their charge lines are orthogonal, the resulting green and blue diffraction gratings do not have parallel components and thus do not produce a beat diffraction grating.

Vertical movement of medium 12 is required to extend the diffraction gratings along the length of medium 12. This movement is provided by a motor 23, which for television applications, moves medium 12 at rate corresponding to the vertical deflection rate—60 fields per second. Then separate frames are formed on medium 12, each corresponding to a field of the televised signal. Likewise, in television applications, the deflection action of deflection system 19 is at the horizontal television deflection rate of 15,750 lines per second.

In the foregoing discussion, only the principal components of a suitable electron writing system have been described. Following is a detailed description of this electron writing system which utilizes beam splitting. A detailed description of electron beam-splitting systems is also presented and claimed in my copending application, Serial No. 782,958, filed December 24, 1958, now Patent No. 3,065,295, dated November 20, 1962 and assigned to the assignee of the present invention.

Referring to the components of FIG. 1 in more detail, the electron gun assembly 14 comprises a point source of electron beam, a hairpin filament 24, that is heated by electrical energy supplied from a source 25. Filament 24 is maintained at a highly negative potential with respect to ground by voltage supplied from a bias voltage source 27, which also supplies a bias voltage to a control electrode 28 for determining the magnitude of the beam current. In television applications, control electrode 28 is also energized, after each deflection of the beams, by a blanking signal that may be obtained from a conventional blanking signal circuit (not shown). Ground potential applied to an anode 29 determines the beam voltage.

The optimum beam current and voltage depend upon the particular characteristics of the electron writing system in which the beam is used. Some of the factors to be considered are the nature of the thermoplastic coating and the width of medium 12, the length of the electron writing system, the bandwidth of the modulating signals, the raster size and the desired resolution. In some applications, the electron beam may have a magnitude of the order of 10 microamps at an acceleration potential of approximately 8 to 15 kilovolts.

The beam-splitting means 15 includes a plurality of small diameter wires 30 extending horizontally across an aperture 31 in anode 29. In a typical application, the number of wires 30 may be 75, but the number subtended or intercepted by the beam may be only three or four or five wires near the center of the wire arrangement. By the use of a large aperture 31 and a large number of wires 30, electric fields produced in the vicinity of the beam are more homogenous. The potential gradient region between wires 30 and anode 29 is extended by two electrodes 32 connected to anode 29.

Wires 30, which are insulated from anode 29 by means not shown, are maintained several hundred volts positive with respect to anode 29 by a voltage from a potentiometer 33 connected across a source of direct voltage 34.

The splitting action is produced by different potential gradients between the vertical edges of aperture 31 and the various wires 30. Due to the closeness of spacing, large potential gradients exist in the spaces between anode 29 and the two wires 30 nearest the vertical edges of aperture 31 that are intercepted by the electron beam. These gradients divert the two portions of the beam passing through these spaces through a relatively large angle towards the system axis. The lesser potential gradients between anode 29 and wires adjacent these end wires 30 diverts, to a lesser degree, the portions of the beam passing in the region of these gradients. The voltage gradients between the anode 29 and the center wires 30 divert even less the portions of the beam near the center. Thus, the electron beam is split into a plurality of beams that are mutually convergent at angles dependent upon the voltage applied to wires 30. Since the electrodes 32 extend the region over which the voltage gradients act upon the beams, these voltage gradients do not have to be large to divert the beam portions.

The potential on wires 30 is preferably adjusted so that the beams have a cross-over point at the focusing system 18. Then the beams can pass through system 18 in regions of low aberrations.

These beams converge as if originating from a plurality of sources, one for each beam, extending along a vertical line through filament 24 in electron gun assembly 14.

The spacings between these virtual sources, and consequently the vertical separation of the beams when focused on medium 12, depend upon the voltage difference between wires 30 and anode 29. By movement of the arm on potentiometer 33, this voltage difference is controlled to make the separations between the beams on medium 12 equal to the grating spacing of the desired green diffraction grating, which may be of the order of one micron.

The wires 30 should be small in diameter—0.3 mil diameter wires are suitable for many applications. The electrons intercepted by large wires produce a charge on the insulating coatings, usually formed on wire surfaces that adversely affects the splitting operation. The separations between wires 30 may be of the order of four or five times the wire diameters.

The charge density control means 16 includes two deflection plates 46 energized by a green video push-pull signal. This push-pull signal is produced by a push-pull amplifier 47 energized by a signal from a modulator circuit 48 that modulates a green video signal from a source with a radio frequency signal from an oscillator 50. Source 49 may be the circuits in a color television camera or receiver that produce a green video signal having maximum amplitude when there is no green color in the televised picture and a minimum amplitude when the green color component is a maximum. Oscillator 50, which produces a carrier frequency of the order of 20 megacycles or higher, may be a conventional oscillator. Also, the push-pull amplifier 47 may be a conventional push-pull amplifier capable of amplifying the modulated signal to approximately 10 volts peak amplitude.

The green video modulated signal applied to deflection plates 46 controls the charge densities of the charge lines 21 formed by the deflection of the split electron beams. It causes the plurality of beams to be directed away from the axis of the focusing system 18 as a function of the magnitude of this green video modulated carrier signal. The greater this signal, the greater the distance the beams are displaced from the focusing system axis and thus the greater their defocusing. The defocusing causes the beams to spread on the surface of medium 12, which spreading decreases the charge densities of the horizontally-extending lines of charge 21 as a function of the magnitude of the green video voltage. Since the amplitude of the green diffraction grating formed by the charge lines 21 depends upon the charge densities of these lines, it also depends upon the magnitude of the green video signal.

The focusing system 18, which focuses each of the plurality of beams to an individual, substantially round spot on the surface of medium 12, is illustrated as an einzel lens comprising three rings 51. The end rings 51 are preferably grounded while the intermediate ring is energized by a voltage of the order of seven kilovolts from a source 52. Either a negative or a positive voltage can provide the lens action but a negative voltage is preferred since less negative voltage is required due to the decelerating action of the resulting electric field. The operation of einzel lenses are well known in the art and explanations thereof can be obtained from many standard electron-optic texts.

The deflection system 19 is an electrostatic deflection system with two vertically-extending deflection plates 53 arranged on opposite sides of the paths of the electron beams. Plates 53 are energized with a complex signal that, for a color television application, includes the conventional horizontal television deflection signal, obtained from a source 54 and which is converted into a push-pull form by a push-pull amplifier 55. One of the push-pull signals is added in an adder circuit 56 with a signal obtained from two modulating operations. In one modulating operation, a modulator circuit 57 modulates a signal from an oscillator 59 with a red video signal from a source 60. In the other modulating operation, a modulator circuit 61 modulates a signal from an oscillator 62 with a blue video signal from a source 63. The signals applied to deflection plates 53 may have a peak magnitude of the order of 500 volts.

The red and blue video signal sources 60 and 63 may be the corresponding circuits in a color television receiver or camera that produce red and blue video signals corresponding directly to the intensity of the red and blue color content, respectively, of the televised picture. In some color television circuits, inverter circuits may have to be included to invert these signals so that they have this correspondence.

The operation of the deflection system 19 can be better understood by reference to FIG. 2 which is a graph of a portion of the deflection signal formed by the output signal from modulator circuit 57 and the deflection signal from source 54. The units of the ordinate are in voltage and those of the abscissa are in time. The deflection signal, represented by a line 64, increases in the conventional saw-tooth voltage fashion. A curve 65, superimposed upon line 64 and which represents the signal from modulator circuit 57, has a frequency equal to the frequency of operation of oscillator 59 and a magnitude corresponding to the amplitude of the red video signal from source 60. The maximum peak amplitude of curve 65 is of the order of 1/200th the maximum amplitude of line 64.

The sum of the line 64 and curve 65 is thus seen to comprise a generally increasing curve with regions 66 in which the voltage increases very rapidly and other regions 67 where, for periods of time, the deflection voltage is substantially constant. Each time the deflection voltage is substantially constant, the then substantially stationary electron beams produce a vertical line of charge of much greater density than when these beams are moving rapidly.

The frequency of operation of oscillator 59 is adjusted to make the points of dwell or stoppage of the vertically-extending beams, and thus the places of formation of the vertical lines of charge 22, occur at distances separated by the grating spacing of the desired red diffraction grating. A typical value of operation for oscillator 59 is 10 megacycles for standard video bandwidth pictures.

The amplitude of the red video signal from source 60 controls the voltage increase corresponding to regions 66 and 67. As the amplitude of this signal increases, the voltage change in regions 67 approaches zero, thus decreasing the deflection rate at times corresponding to regions 67. However, at the same time, the voltage is increased in regions 66, which results in an increase in the deflection rates at times corresponding to regions 66. As a result of these opposite changes in rates of deflection, the electron charge density, formed on places on medium 12 corresponding to regions 67, increases and it decreases on places corresponding to regions 66. Consequently, the depths of the depressions formed by the electron charge increases. It is thus seen that the depressions formed by the vertically-extending lines of charge 22 have depths corresponding to the magnitude of the red color component of the televised picture.

If the signal from modulator circuit 61 were illustrated, it would be similar to curve 65 except that the frequency would correspond to the frequency of operation of oscillator 62 and the magnitude to the blue color content of the televised picture. Thus, the signal from modulator circuit 61 causes the formation of vertical lines of charge 22 on medium 12, separated by distances equal to the grating spacing of the desired blue diffraction grating and with charge densities corresponding to the magnitude of the blue color content of the televised picture. These lines of charge 22, in turn, produce depressions or grating lines corresponding in depth and separation to the densities and separation of these lines of charge.

Although the system of FIG. 1 forms diffraction gratings with grating lines parallel to and normal to the sides of the modulating medium 12, these grating lines can be formed at other angles with respect to these sides by merely changing the direction of movement of medium 12. Further, the diffraction gratings need not correspond to red, blue, and green primary colors but may correspond to other colors and even to monochrome light. That is, in its broadest aspect, this portion of my invention involves the provision of a system for forming at least two diffraction gratings with the grating lines of one grating extending normally to those of the other, irrespective of the utilization of these diffraction gratings.

In FIG. 3 there is illustrated another embodiment of the electron writing system of the present invention. In this embodiment the diffraction gratings formed by the lines of charge 21 correspond to a variable color diffraction grating and the grating formed by the lines of charge 22 correspond to a red diffraction grating. Since many of the components in the FIG. 3 embodiment are identical to those just described with respect to the FIG. 1 embodiment, only those components that are different will be discussed in the following paragraphs.

In the FIG. 3 embodiment, the wires 30 are not maintained at a fixed potential but rather at a varying potential with respect to anode 29 of several hundred volts positive, the instantaneous magnitude of which depends upon the instantaneous green and blue color intensities in a televised picture. For reasons explained below, this voltage is made equal to the sum of a constant and a logarithm of the ratio of the blue to green television signals.

The circuit providing this variable voltage includes sources 35 and 63 of green and blue video signals, respectively, that provide voltages of increasing amplitude when the green and blue color intensities increased.

The circuit components for converting these green and blue video signals to the desired logarithmic form comprise two logarithmic amplifiers 37 and 38 and a pentode circuit having a pentode 39 and a plate resistor 40. The operating direct voltages are obtained from a voltage source 42 and applied to the plate resistor 40 and through a screen grid resistor 43 to the screen grid of the tube 39. A capacitor 44 is connected between the screen electrode and ground. In some applications, the available blue and green video signals may have the desired logarithmic form. Then logarithmic amplifiers 37 and 38 may be omitted.

In the operation of this circuit, the green video signal is converted to logarithmic form by amplifier 37 and conducted to the grid electrode of pentode 39, while the blue video signal, after being converted to logarithmic form by logarithmic amplifier 38, is conducted to the cathode electrode. Since the logarithmic green video signal is applied to the grid electrode, it produces a minus logarithmic signal across resistor 40, while the logarithmic blue video signal, applied to the cathode electrode, produces a positive logarithmic signal. Thus, a difference signal is produced across resistor 40 equal to the logarithm of the blue video signal minus the logarithm of the green video signal. From conventional logarithmic considerations, it is apparent that this difference signal is identical to the logarithm of the ratio of the intensities of the blue and green video signals. This varying signal, which appears at the plate electrode of pentode tube 39 is directly coupled to wires 30.

With the plate electrode of pentode tube 39 directly connected to wires 30, a constant potential is also applied to these wires. This potential is a function of the magnitude of resistor 40 as well as the potential supplied from source 42.

The total signal applied to wires 30 has a varying component, the peak magnitude of which may be of the order of 50 volts and a constant component of the order of 250 volts positive with respect to anode 29. This constant component should correspond to the color produced when the blue and green color intensities are equal, which color for a conventional color television system, has a wavelength of approximately 4930 angstroms.

Before proceeding with a discussion of the FIG. 3 embodiment, a brief explanation will be given of this variable color optics. A more complete explanation is presented in my copending application, Serial No. 688,597, filed October 7, 1957, assigned to the assignee of the present invention, now Patent No. 2,919,302, and in which variable color optic systems are described and claimed. In a preferred embodiment, a large range of colors are produced by two diffraction gratings, one corresponding to the red color content and the other to the relative blue and green color content of the televised picture. As is explained in the above application, all the colors that can be obtained through the combination of the fixed blue, green, and red primary colors of the conventional color television system can also be obtained through the use of one fixed primary color, for example, red, and a primary color varying between two colors, for example, blue and green.

To obtain the function for this variable primary color, a line is drawn through the two points on the Commission Internationale d'Eclairage Chromaticity Diagram corresponding to the green and blue primary colors of a color television system. Then the colors along this line are plotted against the relative intensities of the blue and green primary colors required to produce the colors along this line. The obtained curve is approximately a logarithmic function. That is, the wavelength of each color along this line is a function of the logarithm of the ratio of the intensities of the blue to green primary colors that, when added, produce this color. Thus, in this color system, the blue and green primary color components are not used individually. Instead, the logarithm of the ratio of their intensities is utilized to produce a diffraction grating that diverts to the projection screen, light of a color that, when added to red, produces the desired color. For the projection of different colors, the color added to red is different. Consequently, it is called a variable color.

Referring again to the FIG. 3 embodiment, the logarithmic signal, when applied to the wires 30, produces a potential gradient that splits the electron beam into a plurality of beams that strike the surface of medium 12 with vertical separations equal to the grating spacing of the diffraction grating for the variable color. When the green or blue content of the picture changes, the variable color signal changes and thus these separations change.

The density control means 16 includes two deflection plates 46, one of which is grounded and the other of which is energized by a modulated signal from a source 69, which signal comprises a carrier wave modulated by a conventional Y—R television signal. The Y signal is the sum of the intensities of the red, green, and blue video signals while the R signal is the intensity of the red video signal. Thus, the Y—R signal is the sum of the intensities of the green and blue video signals. A Y—R signal is available in conventional color television receivers and camera circuits and can be applied to the carrier wave in a conventional modulator circuit. It also can be obtained by adding and inverting the output signals from the green and blue video signal sources 35 and 63. The carrier signal has a much higher frequency than the Y—R signal and may be, for example, greater than 20 megacycles.

The Y—R deflection signal applied to deflection plates 46 controls the charge densities of the charge lines 21 by directing the plurality of beams away from the axis of the focusing system 18 as a function of the magnitude of this Y—R modulated carrier signal. The more the beams are directed away from this axis, the greater their defocusing, and thus the less the charge densities of lines 21.

In the deflection system 19, the deflection plates 53 are energized with a signal that is the conventional horizontal television signal obtained from source 54 and which is converted into push-pull form by a push-pull amplifier 55. One of the push-pull signals is added in adder circuit 56 with a signal obtained from a modulating operation in which the modulator circuit 57 modulates a signal from the oscillator 59 with the red video signal from source 60.

As previously mentioned, the modulated signal added to the deflection signal produces velocity modulation of the electron beams. The result is that the charge densities of the charge lines 22 are determined by the amplitude of the red video signal and the separations between these charge lines by the frequency of operation of oscillator 59.

Since the charge lines 21 and 22 are normal with respect to one another, the resulting red and variable color diffraction gratings will be orthogonally arranged.

In FIG. 4, there is illustrated an optical system for transducing color information in the form of normally-extending diffraction gratings 21' and 22' on medium 12 formed by charge lines 21 and 22, respectively, into a color image on a projection screen. A light beam containing at least the colors corresponding to the diffraction gratings in medium 12 is produced by carbon electrodes 72 and focused by a mirror 73 on a first masking means illustrated as an opaque rectangular-shaped member 74 in which first and second sets 75 and 76 of transparent areas are orthogonally arranged. Transparent areas 75, which may be parallel-rectangular-shaped slits in member 74, extend in a direction parallel to the grating lines 22' of the red and blue diffraction gratings. Transparent areas 76, which are similarly shaped, extend in a direction parallel to the grating lines 21' of the green diffraction grating.

The light transmitted by transparent areas 75 and 76 is focused by a lens system 77 on a second masking means after being transmitted by medium 12 and an aperture 78 in a frame 79. The second masking means comprises a rectangular-shaped opaque member 80 in which two sets of transparent areas 81 and 82 extend parallel, respectively, to the transparent areas 75 and 76 in the first masking means.

When there are no diffraction gratings in medium 12 with grating lines 22' parallel to transparent areas 75, the light transmitted by areas 75 is focused by lens 77 upon the opaque areas between the transparent areas 81 in the second masking means. Also, in the absence of diffraction gratings with grating lines 21' parallel to transparent areas 76, light transmitted by transparent areas 76 is focused upon the opaque areas between the transparent areas 82 in the second masking means. Thus, no light is transmitted by the second masking means to a projection screen 83.

When these grating lines 21' and 22' are present, they diffract colored light to screen 83. Grating lines 22' diffract the light transmitted by transparent areas 75 such that, preferably, most of the first order diffracted red and blue light transmitted by areas 75 and diffracted by the respective grating lines 22' is diverted through the transparent areas 81 to be projected on screen 83 by a lens system 84. Likewise, grating lines 21' diffract the light transmitted by areas 76 such that most of the first order diffracted green light diffracted by these grating lines 21' is diverted through the transparent areas 82 and is focused on screen 83. The intensity of the light diffracted by these diffraction gratings and transmitted by these transparent areas is a function of the amplitudes of the respective diffraction gratings—the greater the amplitudes, the greater the intensity of the light incident on screen 83. The resulting red, green, and blue light on screen 83 combine to produce a color image corresponding to the televised picture.

FIG. 5 is a schematic diagram of several components of the optical system of FIG. 4 with light rays illustrating the operation. A single ray 85 emanating from one of the horizontally-extending transparent areas 76 is focused by lens 77, when there are no grating lines 21', at a point 86 on the opaque material 80 of the second masking means. However, if there are grating lines 21', they diffract light from this ray and produce a spectrum, the first order colors of which are indicated by the areas 87, 88, and 89 corresponding, respectively, to the first order diffracted red, green, and blue light. The intensity of this first order diffracted light depends upon the depths of the grating lines 21', as previously mentioned. The opaque member 80 blocks the first order diffracted red light 87 and blue light 89, but a transparent area 82 transmits the first order diffracted green light 88, which is then focused by lens 84 at a point 90 on the screen 83.

A similar explanation could be presented for the diffraction by grating lines 22' of the light from transparent areas 75 that is diffracted through areas 81.

The positions and sizes of the transparent areas 76 and 82, which depend upon the desired spectral distribution of green light, are a function of the separation "d" between the modulating medium 12 and the second masking means, the grating spacing "s" of the green diffraction grating, and upon the wavelengths "λ" of the desired green light. The desired spectral distribution may be, for example, that shown in FIG. 6 wherein intensity units extend along the ordinate and wavelength units along the abscissa.

In FIG. 6 there is illustrated a curve 91 for green light, a curve 92 for blue light, and a curve 93 for red light. Only the curve 91 for green light will be considered in the following discussion, this being the only curve pertinent to the widths and positions of transparent areas 76 and 82, but a similar analysis could be made with curves 92 and 93 for determining the widths and positions of the transparent areas 75 and 81.

Curve 91 can be understood from a consideration of several critical points. For example, the two end points are at wavelengths of 460 and 615 millimicrons, which indicates that of the light diffracted by the green diffraction grating, only that between 460 and 615 millimicrons should be transmitted by the transparent areas 82. Also, the 50% points are at 475 and 580 millimicrons while the 100% region extends between 490 millimicrons and 550 millimicrons. This means that twice the intensity of light at the wavelengths between 490 and 550 millimicrons should be transmitted by the transparent areas 82 as is transmitted for light wavelengths of 475 and 580 millimicrons.

From curve 91 and the diffraction equation $$d_1 = \frac{d}{s}\lambda$$

wherein "$d_1$" is the distance of the first order diffracted light of wavelength λ from the zero order point 86, the positions and widths of transparent areas 76 and 82 can be determined. This equation is the well known diffraction light equation valid for small angles of diffraction including the angles of the first order diffracted light.

The application of this equation can be understood by reference to FIGS. 7 and 8 in which there is illustrated only a portion of the first masking means with one transparent area 76, and likewise, a portion of the second masking means with two transparent areas 82 in FIG. 7 and one in FIG. 8. However, the results obtained are equally applicable to all areas 76 and 82. Also, although the lens system 77 and modulating medium 12 are not illustrated, they are considered in the following discussion as acting on the light beams.

Information obtained from FIG. 7 can be used in the diffraction light equation to determine the widths and positions of the transparent areas 82 in the second masking means. In FIG. 7, two beams 94 and 95 of wavelengths 580 and 475 millimicrons, respectively, are imaged by lens system 77 on the second masking means. If there is no magnification or demagnification in the system, they are imaged at areas equal in size to transparent area 76 in the first masking means. Since these wavelengths are at 50% points on curve 91, only half of the light of these wavelengths diffracted in the region of transparent area 82 is transmitted by transparent area 82. Consequently, the centers of beams 94 and 95 must strike the upper and lower edges, respectively, of transparent area 82 since only then does exactly half the light in each beam strike area 82. With the position of the image of beam 95 known, the distance $d_1$ from zero order point 86 to the bottom edge of transparent area 82 can be determined by inserting the wavelength 475 millimicrons in the diffraction equation. The distance to the top edge of transparent area 82 is determined by inserting 580 millimicrons in this equation. Thus, the width and position of transparent area 82 and of all the transparent areas 82 are determined.

There is another transparent area 82 between the zero order point 86 and the area 82 through which the first order diffracted light is transmitted. It has been found that this area 82 can be inserted and yet the desired masking obtained. Similar extra transparent areas 76 are inserted in the first masking means. These extra areas increase the light output by a factor of three.

The widths of areas 76 can be determined from the diffraction equation and the illustration of FIG. 8. In FIG. 8, two beams 96 and 97 of wavelengths of 490 and 460 millimicrons, respectively, are imaged on the second masking means by lens system 77. Because the light of 490 millimicrons wavelength is the shortest wavelength in the 100% intensity region of curve 91, the bottom edge of the image of this beam 96 must just strike the bottom edge of transparent area 82. If a beam of any shorter wavelength were in this position, the 100% intensity region of curve 91 would extend to shorter wavelengths than 490 millimicrons, while if light of any longer wavelength were there, the image of the light of wavelength 490 millimicrons would not be entirely within transparent area 82 and the point of curve 91 corresponding to 490 millimicrons could not be at 100% intensity. The position of the image of beam 97 is also known since light of 460 millimicrons is the shortest wavelength light transmitted by the transparent area 82 from diffraction by the green diffraction grating in medium 12. Therefore, the top edge of the image of beam 97 must extend only slightly beyond the bottom edge of transparent area 82.

From the adjacent positions of the images of beams 96 and 97 from the knowledge that each has a width equal to the width of transparent area 76, the width of transparent area 76 and of all of the transparent areas 76 can be determined. The widths of these images are determined but not directly, but rather through a determination of the distance between the centers of these images. This distance, which is equal to the width of either image, can be determined by first inserting 490 and then 460 millimicrons in the diffraction equation and obtaining the difference in the two calculated distances from the zero order point 86. This difference then is the width of transparent area 76. If there is magnification or demagnification in this system, this calculation is different from the width of transparent area 76 only by the magnification or demagnification factor.

The position of transparent area 76 can be determined from conventional optical considerations since, for proper masking, it is known where the light from transparent area 76 must strike the second masking means. That is, the zero order point 86 is in the middle of an opaque section 80 in the second masking means. Consequently, the position of area 76 is that from which undiffracted light will be imaged at point 86.

The same considerations can be used to determine the widths and the positions of the transparent area 75 in the first masking means and transparent areas 81 in the second masking means for the red and blue light. However, a compromise is usually necessary because the widths and positions of the transparent areas determined for the desired blue spectral distribution curve 92, while almost the same, usually differ from the widths and positions for the passage of red light corresponding to the desired red spectral distribution curve 93.

In FIG. 9 there is illustrated a masking means, two of which can be substituted for the first and second masking means in FIG. 4. This masking means comprises an opaque body 98 provided with a plurality of parallel transparent areas 99 extending at an angle of approximately 45° with the grating lines of the diffraction gratings in medium 12. The angles may be other than 45° but the 45° arrangement is the simplest. Of course, only the component of these transparent areas 99 parallel with the respective grating lines is effective with respect to these grating lines. One advantage of this masking system is that since all of the areas 99 are parallel, it is, in this respect, easier to construct than the masking means of FIG. 4.

In FIG. 10 there is illustrated a reflection-type optical system embodiment of the present invention in which a fixed-type modulating medium 100, such as a transparent oil, is utilized. However, with some minor modifications, a movable medium such as the thermoplastic medium 12 previously illustrated can be used instead. There are many suitable materials for modulating medium 100, including beeswax, methyl silicon fluids, and other materials described and claimed in my copending application, Serial No. 708,528, filed January 7, 1958, and which is assigned to the assignee of the present invention.

In FIG. 10, polychrome light is produced by carbon electrodes 72 and focused by a mirror 73 upon a square aperture 101 in an opaque frame 102. The size of the image projected on screen 83 is dependent upon the size of aperture 101. The light transmitted by aperture 101 projects, after transmission through a lens system 103, on a masking means comprising a plurality of reflecting curved bars arranged in four sets: 104, 105, 106, and 107. The light reflected from these bar sets is focused by lens system 103 on medium 100 in a direction parallel to the respective bars from which the light reflects. This light is then reflected back onto this masking means by a mirror 108, illustrated as a grounded conducting spherical mirror, positioned beneath modulating medium 100.

An optical system utilizing curved reflecting bars is described and claimed in my copending application, Serial No. 782,957, filed December 24, 1958, and which is assigned to the assignee of the present invention.

Diffraction gratings in medium 100 with grating lines parallel to the center lines of bar sets 106 and 107 diffract colors corresponding to these diffraction gratings through transparent areas 109 and 110 illustrated as slits between the bars 111 and 112, respectively, of bar sets 106 and 107. Similarly, diffraction gratings with grating lines parallel to the bars 113 and 114 of bar sets 104 and 105, respectively, diffract colors corresponding to these diffraction gratings through transparent areas 115 and 116 between the bars 113 and 114.

The factors for determining the sizes and positions of the transparent areas as well as the reflecting bars in the masking means of FIG. 10 are basically the same as those previously described with reference to the optical system of FIG. 4. However, in FIG. 10, these factors must be altered due to the tilt of the masking means with respect to mirror 108, which tilt is required for the reflection of light onto the modulating medium 100.

There is another factor in utilizing the previously mentioned considerations, since the single masking means in FIG. 10 performs the functions of the two masking means in FIG. 4. By reflection, bars 111, 112, 113 and 114 produce the plurality of separate light sources produced by the first masking means in FIG. 4. They also mask the light as does the second masking means in FIG. 4. Thus, in FIG. 10 both sets of calculations are applied to this single masking means.

The values determined for the transparent area widths in FIG. 4 are the same for the corresponding components in FIG. 10 at the horizontal center line of the masking means. But, for points away from this center line, the differences in object to image distances to mirror 108 must be considered.

The widths of the plurality of light sources (the widths of areas 75 and 76) produced by the masking action can be related to the widths of the virtual sources of light produced by the condensing action of lens system 103 and the focusing action of the bars 111, 112, 113 and 114. For bars 113 and 114 closest to the horizontal axis of the system, the widths of the virtual light sources are approximately equal to the widths of the beams produced by transparent areas 76 in FIG. 4. These widths are only "approximately" equal since the end bars 113 and 114 are not on the horizontal center line. Similarly, the widths of the virtual sources of the beams produced by the condensing action of lens system 103 and the focusing action of the ends of bars 111 and 112 on the horizontal center line, equal the widths of the beams produced by transparent areas 75 in FIG. 4.

The widths of the areas 109, 110, 115, and 116 can be calculated from the equation $$d_1 = \frac{d}{s}\lambda$$

with the consideration that due to the tilt of the masking means, $d$, the distance between modulating medium 100 and the bars 111, 112, 113, and 114 varies along the lengths of bars 111 and 112 and also varies for different bars 113 and 114. Also, the difference in magnification factor for the magnification from mirror 108 to different parts of the masking means must be considered. Since all of these calculations involve only conventional optical considerations, they can be readily determined.

If the bars 111 and 112 from bar sets 106 and 107 are placed end-to-end and the bars 113 and 114 from bar sets 104 and 105 are placed side-by-side, the configuration illustrated in FIG. 11 is obtained. The bars 111 and 112 form a fan-shaped pattern while bars 113 and 114 form a fan-shaped and also parallel pattern increasing in size and separation along one direction.

For the purest transmitted light, the transparent areas 109, 110, 115 and 116 of the masking means in FIG. 10 should be on the focal surface of mirror 108. For a spherical mirror, the best focal surfaces are circles, concentric to the axis of mirror 108 and arranged on a spherically-shaped surface. Since the edges of the bars 111, 112, 113, and 114 are linear, the transparent areas therebetween cannot lie on these circles. An optimum result could be obtained by curving these bars longitudinally, but such bars are costly to manufacture. If mirror 108 is a cylindrical mirror, the linear edges of the bars 111, 112, 113, and 114 can lie on the focal surface thereof.

For a spherical mirror, the best approximation to the optimum focal surface for linear edged bars is obtained when bars 111 and 112 lie on a conical surface and bars 113 and 114 on an elliptical surface, which surfaces are tangent to the surface of best focus.

The axial components of the radii at the two ends of the pairs of bar sets should be $R_1$ and $R_2$ wherein the ratio $$\frac{R_1}{R_2}$$

is equal to $$\frac{A}{B}$$

and A and B are the minimum distances, respectively, from the tops and bottoms of these pairs of bar sets to the center of mirror 108. The center radius should be $\sqrt{2}R_0$, the axial component of which is $R_0$ providing the mirror is tilted at an angle of 45°, wherein $R_0$ is one-half the radius of curvature of mirror 108.

Light reflected from bars 113 is reflected from mirror 108 onto the bars 114 in the absence of diffraction gratings with grating lines parallel to these bars 113 and 114. But any such diffraction gratings diffract certain colors, the colors corresponding to the grating spacings, through the transparent areas 116. Likewise, light reflected from the bars 114 and then from mirror 108, strikes bars 113 in the absence of these diffraction gratings. But when there are these gratings, they diffract these colors through transparent areas 115. Similarly, diffraction gratings with grating lines parallel to the center lines of bar sets 106 and 107 diffract corresponding colors through transparent areas 109 and 110.

The light transmitted by this masking means is projected by lens system 84 onto projection screen 83 after reflection from a mirror 117 which deflects the light through 90°. The deflection by mirror 117 permits placement of screen 83 parallel with the optical system axis.

The diffraction gratings may be formed on modulating medium 100 by the electron writing system illustrated in FIG. 1 with the addition of a vertical deflection system which is necessary since the modulating medium 100 is not moved. Also, if desired, the electron writing system illustrated in FIG. 3 may be used with the addition of a vertical deflection system, but the illustrated arrangement is that of the FIG. 1 electron writing system.

There is one other change in the electron writing system illustrated in FIG. 10—the charge density control means has been combined with the vertical deflection system. In the electron writing system of FIG. 1, separate deflection plates 46 were provided for the insertion of the green video modulated carrier signal information. However, in the writing system illustrated in FIG. 10, such deflection plates are required anyway for vertical deflection and thus the green modulated carrier signal can be applied to these vertical deflection plates.

In the electron writing system in FIG. 10, the vertical deflection system is illustrated as comprising two deflection plates 124 arranged on opposite sides of the electron beam paths. A vertical deflection signal source 125 supplies these plates 124 with a signal that is converted into push-pull form by a push-pull amplifier 126. One of the push-pull signals is added in an adder circuit 127 with the green video modulated carrier signal from the modulator 48.

In the system of FIG. 1, the green video modulated carrier signal caused the defocusing of the electron beams. However, it cannot do this in the writing system shown in FIG. 10 since it does not affect the beams until after they have been focused. But, a similar result is obtained as with defocusing since the green video modulated carrier signal causes the electron beams to oscillate in a vertical direction and thus causes the charge lines corresponding to the green video color signal to spread as a function of the green video signal.

The remainder of the structure of the electron writing system illustrated in FIG. 10 is identical to that described in FIG. 1 and thus will not be further described.

In FIG. 10, the operation of oscillators 59 and 62 should be synchronized with the deflection signal from source 54 and the operation of oscillator 50 should be synchronized with the deflection signal from source 49 so that the grating lines for successive frames on medium 100 are coincident. This avoids the formation of beat diffraction gratings by residual gratings and newly-formed gratings. Of course, ideally, the gratings from one frame should decrease to zero amplitude before the formation of the gratings for the next frame. But they do not and thus if the residual and new gratings are phase-displaced, beat gratings are formed. However, by synchronizing the oscillators with the deflection signals, the new gratings lie directly on top of the residual gratings, and no beat gratings are formed. In a television application, the deflection synchronizing pulses can be used to provide this synchronization.

In the embodiments of my invention so far described, the transparent areas in the masking means have all been elongated. But they may have many other shapes such as, for example, the circular shape illustrated in FIG. 12.

The first masking means in the FIG. 12 embodiment comprises an opaque member 135 with circular transparent areas 136 therein that may be apertures or merely transparent solid portions of the main material 135. The second masking means may be similarly formed.

The equation $$d_1 = \frac{d}{s}\lambda$$

is applicable to the circular transparent areas 136 as well as other shaped areas, it being realized that the widths of the transparent areas in the direction of diffraction by the pertinent diffraction gratings are determined by this equation, irrespective of the other dimension of the transparent areas.

In FIG. 13 there is illustrated a reflection-type optical system corresponding to the transmission-type optical system of FIG. 12. In FIG. 13, the spaced circular light beams are produced by reflection of light from circular mirrors 137 placed on opaque material 138 with transparent areas 139. The diameters of the mirrors 137 and of the transparent areas 139 and their placement are determined by the same considerations used to determine these factors for the masking means in FIG. 10.

From the foregoing discussion, one skilled in the art will realize that the diffraction gratings need not be phase-diffraction gratings but instead may be, for example, intensity diffraction gratings. Also, the medium in which the diffraction gratings are formed need not be deformable, but may be any material in which any type of light-diffractioin grating can be formed. Further, although it is preferred, it is not necessary that colored light from the first order diffraction pattern be used. In some applications, it may be desirable, for extmple, to use light from the second order diffraction patterns.

While the invention has been described in respect to the specific embodiments, it will be appreciated that many modifications and changes may be made by those skilled in the art without departing from the spirit of the invention. I intend, therefore, by the appended claims, to cover all such modifications and changes as fall within the true spirit and scope of my invention.

What I claim as new and desire to secure by Letters Patent of the United States is:

1. A system for impressing color information on a medium corresponding to a display comprising means for producing a plurality of superimposed light diffraction gratings extending along one direction on said medium, each having one parameter determined respectively by a different color component and each having a separate parameter which varies respectively in accordance with the intensity of the the corresponding color component in the display, and means for producing in said medium a light diffraction grating extending along a direction normal to said one direction and having a parameter varying in accordance with the intensity of a third color component in the display.

2. The system as defined in claim 1 wherein said superimposed light diffraction gratings are phase diffraction gratings with grating lines spaced as functions, respectively, of the wavelengths of selected primary colors and wherein the amplitudes of the grating lines of said superimposed diffraction gratings correspond to the intensities of the respective primary colors in corresponding points of the display.

3. In an optical system for projecting information on a light receiving surface, wherein the information corresponds to the parameters of two diffraction gratings extending orthogonally with respect to each other in a light modulating medium, the combination comprising a source of light for projecting light through said light modulating medium, and a first member positioned between said light modulating medium and said light receiving surface, said first member defining a first set of a plurality of optically transparent areas separated by optically opaque areas, said first set of transparent areas being arranged to transmit at least some of the first order diffracted light diffracted by at least one of said diffraction gratings, said first member also defining a second set of a plurality of optically transparent areas separated by optically opaque areas, said second set of transparent areas being arranged to transmit at least some of the first order diffracted light diffracted by the diffraction grating arranged orthogonally with said one diffraction grating.

4. In an optical system for transducing information in the form of at least two diffraction gratings extending orthogonally with respect to each other in a light modulating medium, the combination comprising means for producing a plurality of spaced light beams for projection on said light modulating medium, and first masking means defining a plurality of optically transparent areas separated by optically opaque areas, said transparent areas being similar in cross-sectional shape to said light beams and oriented to block zero order diffracted light from said medium such that certain color components of the first order diffracted light from said beams selectively pass through said transparent areas as determined by the amounts of diffraction produced by said orthogonally-arranged diffraction gratings in said light modulating medium in accordance with the information contained in the diffraction patterns of said medium.

5. The optical system as defined in claim 4 wherein said means for producing a plurality of spaced light beams comprises a light source and a second masking means positioned between said light source and said light modulating medium, said second masking means defining a plurality of transparent areas separated by optically opaque areas, the transparent areas of said first and second masking means comprising two orthogonally arranged sets of transparent areas with the transparent areas in each of said sets comprising a plurality of parallel, elongated, rectangular-shaped transparent areas.

6. The optical system as defined in claim 5 wherein the transparent areas of said first and second masking means are circular.

7. The optical system as defined in claim 4 wherein said means for producing a plurality of spaced light beams comprises a light source and said first masking means, said first masking means defining a plurality of optically transparent areas separated by optically opaque areas, and reflecting areas on said optically opaque areas for reflecting light from said source to said light modulating medium.

8. The optical system as defined in claim 7 wherein said first masking means comprises opaque material with a plurality of circular transparent areas of a plurality of different sizes arranged in a fan shape such that the sizes of the transparent areas progressively increase from the narrow to the broad part of the fan shape, and wherein said reflecting areas are positioned between said transparent areas and are circular and of a plurality of different sizes arranged in a fan shape such that the sizes of the reflecting areas increase from the narrow to the broad part of the fan shape.

9. The optical system as defined in claim 7 wherein said first masking means comprises a plurality of reflecting curved bars arranged in rectangular form in four quadrants such that in one pair of diagonally-opposed quadrants the curved bars are fan-shaped and are arranged in fan-shaped pattern, and wherein the curved bars in the other of said pairs of diagonally-opposed quadrants are parallel cylindrical element bars arranged substantially perpendicular to the center lines of said fan-shaped quadrants, said parallel cylindrical elements progressively increasing in size and separation in a direction normal to said elements, the smallest of said cylindrical elements being at the end of said masking means where the fan-shaped bars are smallest.

10. An information writing and projection system for displaying color images corresponding to applied color video electrical signals, comprising a deformable medium, means responsive to said applied electric signals for producing a light diffraction grating in said deformable medium corresponding to at least one color signal and extending in one direction, means responsive to said applied electrical signals for producing a light diffraction grating in said deformable medium corresponding to another color signal and extending in a direction orthogonal to said one direction, means for producing a plurality of spaced light beams for projecting on said deformable medium, and masking means defining a plurality of optically transparent areas separated by optically opaque areas, said transparent areas being similar in shape to the cross-sectional shape of said light beams and oriented and dimensioned to determine color components of the first order diffracted light from said beams that pass through said transparent areas by the amount of diffraction produced by said orthogonally-arranged diffraction gratings in said deformable medium.

11. A system for producing orthogonally-arranged light diffraction gratings in a deformable medium as functions of at least first and second applied electrical signals comprising means for impinging said medium with a plurality of substantially linearly-arranged electron beams for producing depressions in said deformable medium with depths that are a function of the amplitude of said first electrical signal, and means for deflecting said electron beams across said medium normal to said linear arrangement, said deflecting means including means for momentarily retarding the deflection at a cyclic rate by amounts that are a function of the amplitude of said second applied electrical signal.

12. A system for simultaneously producing orthogonally extending diffraction gratings in a deformable medium, comprising a deformable medium, means for producing an electron beam, and means for controlling said electron beam to form a charge pattern on said medium comprising orthogonally extending lines of electron charge for deforming said medium.

13. A system for producing orthogonally extending diffraction gratings in a light modulating medium, which gratings have parameters corresponding to different preselected primary colors in a display, comprising means for impinging said light modulating medium with a plurality of electron beams spaced substantially along a line with separations that are a function of the characteristics of one of said preselected primary colors, means for deflecting said beams normal to said line to produce a first set of lines of electron charge, means for controlling the charge densities of said first set of lines of electron charge as a function of the characteristics of said one preselected primary color, means for velocity modulating said electron beams normal to the direction of said first set of lines of electron charge as a function of the characteristics of another of said preselected primary colors to produce a second set of lines of charge normal to said first set, wherein the lines of electron charge in said second set have separations and densities that are a function of the characteristics of said another preselected primary color.

14. A system for producing a charge pattern on a medium with two sets of lines of electron charge extending normally with respect to one another corresponding to two sets of information, comprising means for impinging said medium with a plurality of electron beams spaced aong a line to produce one set of lines of charge corresponding to one set of information and means for producing relative movement between said medium and said beams in a direction normal to said line, in periodic steps to produce a second set of lines of charge orthogonal to said one set and corresponding to a second set of information.

15. A system for presenting color information in a medium corresponding to a display comprising means for producing a diffraction grating extending along one direction in said medium and having parameters corresponding to the red color components in the display, and means for producing in said medium a light diffraction grating extending along a direction normal to said one direction and having parameters corresponding to the green and blue color components in the display.

16. A system for producing orthogonally-extending diffraction gratings in a light modulating medium, which gratings have parameters corresponding to different preselected primary colors in a display one of said primary colors being variable with the colors in said display, said system comprising means for impinging said light modulating medium with a plurality of electron beams spaced substantially along a line with separations that are a function of the variable color content in the display, means for deflecting said beams normal to said line to produce a first set of lines of electron charge, means for controlling the charge densities of said first set of lines of electron charge as a function of the intensity of the variable primary color, means for velocity modulating said electron beams normal to the direction of said first set of lines of electron charge as a function of the characteristics of a preselected primary color of the display to produce a second set of lines of charge normal to said first set, wherein the lines of electron charge in said second set have separations and densities that are a function of the characteristics of said other preselected primary color.

17. Apparatus for writing information on a deformable light modulating medium by means of an electron beam comprising means for geenrating an electron beam, means for producing relative movement between said medium and said beam to scan said beam over an area of said medium, and means for controlling said beam in accordance with several components of information to be impressed on said medium to produce lines of charge extending in one direction on said area and of a predetermined spacing and of a charge density which varies in accordance with the magnitude of one component of information and for producing lines of charge extending in a direct orthogonal thereto having different spacings determined by other components of information impressed on said medium and charge densities corresponding respectively to the magnitude of said other components of information, said medium being deformed by the forces produced by said lines of charge to form corresponding orthogonally arranged superimposed diffraction gratings.

18. Apparatus for impressing color information on a light modulating medium comprising means for producing a diffraction grating in said medium extending in one direction and having a given spacing and an amplitude dependent upon the intensity of one color component, means for producing diffraction gratings on said medium extending in a direction orthogonal to said first direction having spacings of different magnitudes determined by other color components impressed on said medium in said orthogonally extending diffraction gratings and amplitudes corresponding respectively with the corresponding ones of said other color components, means for producing a colored light output dependent upon the color information contained in said orthogonally extending diffraction gratings including means for illuminating said medium with light including at least the light components impressed on said medium, and means including light masking means cooperating with said medium for determining the light output from said medium by differences in the diffraction of light impinging upon said medium produced by the grating spacings of different magnitudes contained in said orthogonally extending diffraction gratings.

19. Apparatus for impressing color information on an area of a deformable light modulating medium corresponding to an image to be projected and for projecting the image comprising means for generating an electron beam, means for producing relative movement between said medium and said beam to scan said beam over an area of said medium, means for controlling said beam in accordance with electrical signals corresponding to the color components and their intensities to provide superimposed orthogonally extending light controlling deformations on said medium with the deformations extending in one direction in said medium having an amplitude dependent upon the intensity of one color component and the light controlling deformations extending in an orthogonal direction comprising superimposed diffraction gratings having spacings determined respectively by other color components impressed on said medium by said electric signals and amplitudes corresponding respectively to the intensities of said other color components, means for impinging light on said medium including the different color components and masking means cooperating with said light modulating medium for selectively transmitting light in accordance with said superimposed orthogonally arranged light controlling deformations and determining by differences in diffraction produced by the different spacings of said superimposed diffraction gratings the color and intensity of the light projected corresponding to said other color components.

20. A system for simultaneously producing superimposed orthogonally extending diffraction gratings in a deformable light-controlling medium with a parameter of the diffraction grating extending in one direction varying in accordance with one parameter of a component of information to be impressed on the medium and a parameter of the diffraction grating extending in the orthogonal direction having a parameter varying in accordance with a parameter of a second component of information to be impressed on the medium, comprising a deformable medium, means for producing an electron beam and means for controlling said electron beam to form a charge pattern on said medium for deforming said medium including orthogonally extending lines of electron charge with the charge density of the lines of charge extending in one direction varying in accordance with said parameter of said one component of information and the charge density of the lines of charge extending orthogonally thereto varying in accordance with said parameter of said second component of information so that the diffraction grating established by the deformation of said medium extending in one direction has a parameter corresponding to said parameter of said one component of information and the diffraction grating extending orthogonal thereto has a parameter corresponding to the parameter of said second component of information.

References Cited in the file of this patent

UNITED STATES PATENTS

| | | |
|---|---|---|
| 2,713,083 | Tomer | July 12, 1955 |
| 2,740,829 | Gretener | Apr. 3, 1956 |
| 2,813,146 | Glenn | Nov. 13, 1957 |
| 2,863,091 | Epstein et al. | Dec. 2, 1958 |
| 2,864,032 | Amdursky et al. | Dec. 9, 1958 |
| 2,880,268 | Ballard | Mar. 31, 1959 |